(12) United States Patent
Liu

(10) Patent No.: US 11,096,374 B1
(45) Date of Patent: Aug. 24, 2021

(54) PET HOUSE ACCESSORY WITH FUNCTIONS OF AIR PURIFICATION, STERILIZATION AND TEMPERATURE REGULATION

(71) Applicant: XIAMEN XIAOLING TECHNOLOGY CO., LTD., Xiamen (CN)

(72) Inventor: Jiayi Liu, Xiamen (CN)

( * ) Notice: Subject to any disclaimer, the term of this patent is extended or adjusted under 35 U.S.C. 154(b) by 0 days.

(21) Appl. No.: 17/160,313

(22) Filed: Jan. 27, 2021

(30) Foreign Application Priority Data

Nov. 3, 2020 (CN) .......................... 202022510630.7

(51) Int. Cl.
*A01K 1/03* (2006.01)
*A01K 1/00* (2006.01)

(52) U.S. Cl.
CPC ............ *A01K 1/033* (2013.01); *A01K 1/0052* (2013.01); *A01K 1/0058* (2013.01); *A01K 1/0064* (2013.01)

(58) Field of Classification Search
CPC .... A01K 1/0058; A01K 1/033; A01K 1/0064; A01K 1/0052
See application file for complete search history.

(56) References Cited

U.S. PATENT DOCUMENTS

| 2005/0279286 | A1* | 12/2005 | Youngmark | A01K 1/0353 |
| | | | | 119/28.5 |
| 2012/0006280 | A1* | 1/2012 | Gray | A01K 1/033 |
| | | | | 119/500 |
| 2018/0064060 | A1* | 3/2018 | Romney | A01K 1/033 |
| 2018/0359985 | A1* | 12/2018 | Jung | A01K 1/0245 |
| 2019/0021272 | A1* | 1/2019 | Marshall, III | A01K 1/0047 |
| 2019/0357495 | A1* | 11/2019 | Liu | A01K 1/01 |

FOREIGN PATENT DOCUMENTS

| CA | 3023366 A1 * | 9/2018 | ............ A01K 1/00 |
| DE | 3139997 A1 * | 3/1983 | ......... A01K 1/0052 |
| WO | WO-2016196888 A1 * | 12/2016 | ......... A01K 1/0058 |
| WO | WO-2017160886 A1 * | 9/2017 | ......... A01K 1/0047 |

* cited by examiner

*Primary Examiner* — Monica L Barlow
*Assistant Examiner* — Aaron M Rodziwicz
(74) *Attorney, Agent, or Firm* — ZANIP

(57) ABSTRACT

A pet house accessory with functions of air purification, sterilization and temperature regulation, including a shell, a mounting plate, a thermal conduction device, a semiconductor refrigeration sheet and a sterilization device, wherein a heat dissipating hole is arranged at the center of the bottom of the shell, the thermal conduction device is arranged at the center of the bottom of the mounting plate, the semiconductor refrigeration sheet is fixedly installed at the bottom of the thermal conduction device, and a through hole is defined inside the thermal conduction device. The pet house accessory with functions of air purification, sterilization and temperature regulation provided by the present disclosure is capable of cooling and heating by controlling the semiconductor refrigeration sheet through the control switch to cool down and warm the pet house, and is convenient for pets to live.

6 Claims, 5 Drawing Sheets

PET HOUSE ACCESSORY WITH FUNCTIONS OF AIR PURIFICATION, STERILIZATION AND TEMPERATURE REGULATION

FIELD OF THE INVENTION

This disclosure relates to a field of pet house temperature controlling, in particular to a pet house accessory with functions of air purification, sterilization and temperature regulation.

BACKGROUND OF THE INVENTION

As more and more people keeping pets, in order to improve the safety of pet owners, pets are usually kept in pet houses. The traditional pet houses are small and relatively closed, which are easy to breed bacteria inside, produce odor and affect the surrounding environment. Therefore, it is necessary for the pet owners to spend more time and attention to disinfect the pet houses, which greatly increases workload of the pet owners. Besides, such pet house does not have the function of temperature regulation, which is unable to meet the requirements of different pets, especially in winter and summer, which may affect the normal life of pets.

Therefore, the present disclosure provides a pet house accessory with functions of air purification, sterilization and temperature regulation.

SUMMARY OF THE INVENTION

In order to solve the problem of the prior arts, the present disclosure provides a pet house accessory with functions of air purification, sterilization and temperature regulation which is capable of cooling and heating by controlling the semiconductor refrigeration sheet through the control switch to cool down and warm the pet house, and is convenient for pets to live. The thermal conduction efficiency can be improved by the mounting plate and the thermal conduction device, and the air inside the pet house can be purified. The pet house accessory with functions of air purification, sterilization and temperature regulation has a simple structure and is convenient to use.

A pet house accessory with functions of air purification, sterilization and temperature regulation, including a shell, a mounting plate, a thermal conduction device, a semiconductor refrigeration sheet and a sterilization device, wherein a heat dissipation hole is arranged at the center of the bottom of the shell, the thermal conduction device is arranged at the center of the bottom of the mounting plate, the semiconductor refrigeration sheet is fixedly installed at the bottom of the thermal conduction device, and a through hole is defined inside the thermal conduction device, an exhaust pipe and the sterilization device are separately fixed on two sides of the thermal conduction device, and an air intake fan is fixedly installed at one end of the sterilization device, an exhaust hole is defined on the mounting plate on one side of the thermal conduction device, the mounting plate is installed on the top of the shell through a mounting hole, and a sensor is installed inside the exhaust pipe.

Preferably, both sides of the shell are provided with an air inlet, and the air intake fan is arranged on one side of the air inlet.

Preferably, the mounting plate is integrally formed with the thermal conduction device.

Preferably, a radiator is fixedly installed at the bottom of the semiconductor refrigeration sheet, and a cooling fan is fixed on the bottom of the radiator through screws, the cooling fan is arranged directly above the heat dissipation hole.

Preferably, a UV disinfection lamp is fixedly installed inside the sterilization device.

Preferably, a mounting groove is defined at the center of the front side of the shell, a control switch is installed inside the mounting groove, and the control switch is electrically connected with the semiconductor refrigeration sheet, the cooling fan, the UV disinfection lamp, the air inlet fan and the sensor.

The pet house accessory with functions of air purification, sterilization and temperature regulation provided by the present disclosure is capable of cooling and heating by controlling the semiconductor refrigeration sheet through the control switch to cool down and warm the pet house, and is convenient for pets to live. By using the mounting plate and the thermal conduction device, the thermal conduction efficiency can be improved and the power waste can be reduced. By using the UV disinfection lamp, the air entering the pet house can be purified, the air quality inside the pet house can be improved, and the bacteria breeding can be avoided. The pet house accessory with functions of air purification, sterilization and temperature regulation of the present disclosure has a simple structure and is convenient to use.

BRIEF DESCRIPTION OF THE DRAWINGS

The following drawings of the present invention are used to understand the invention as a part of it. The drawings show a embodiment and the description of the embodiment, so as to explain the principle of the invention, in which.

In the figures.

Figure 1:
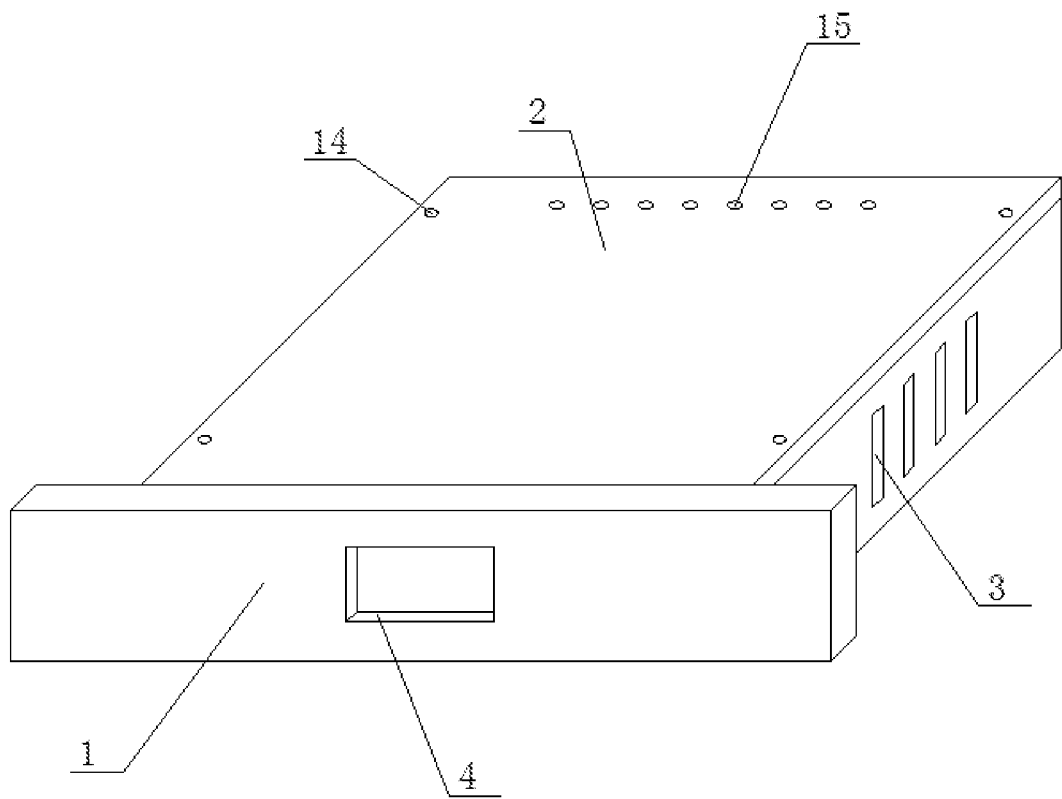
FIG. 1 shows the top view of the pet house accessory with functions of air purification, sterilization and temperature regulation of the present disclosure.

1, shell; 2, mounting plate; 3, air inlet; 4, mounting groove; 5, heat dissipation hole; 6, thermal conduction device; 7, semiconductor refrigeration sheet; 8, radiator; 9, cooling fan; 10, exhaust pipe; 11, sterilization device; 12, UV disinfection lamp; 13, air inlet fan; 14, mounting hole; 15, exhaust hole; 16, through hole; 17, sensor.

DETAILED DESCRIPTION OF THE EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the size and the relative dimension of layers and areas may be exaggerated for clear. Like numbers refer to like elements throughout.

Figure 2:
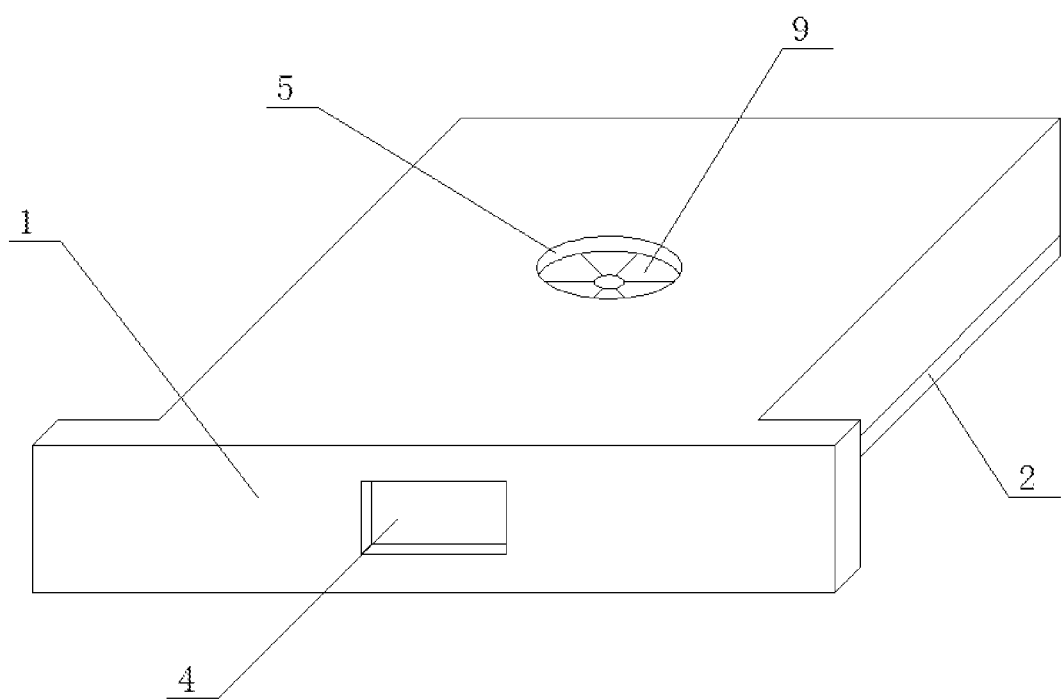
FIG. 2 shows the bottom view of the pet house accessory with functions of air purification, sterilization and temperature regulation of the present disclosure.
Figure 3:
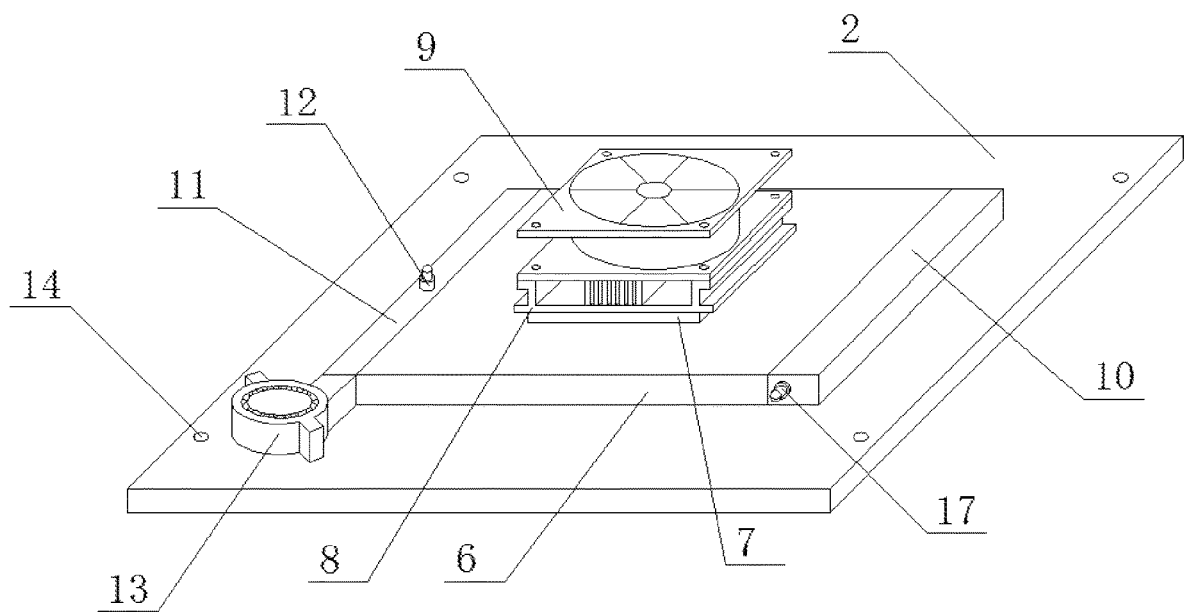
FIG. 3 shows the partial structure figure of the pet house accessory with functions of air purification, sterilization and temperature regulation of the present disclosure.
Figure 4:
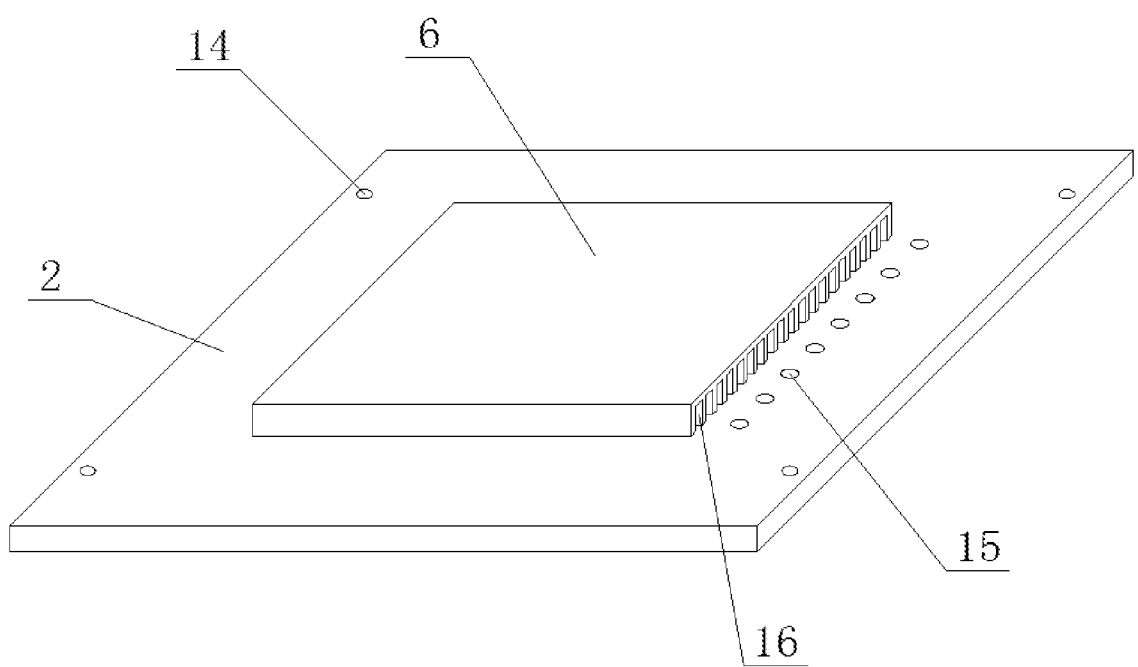
FIG. 4 shows the mounting plate of the pet house accessory with functions of air purification, sterilization and temperature regulation of the present disclosure.
Figure 5:
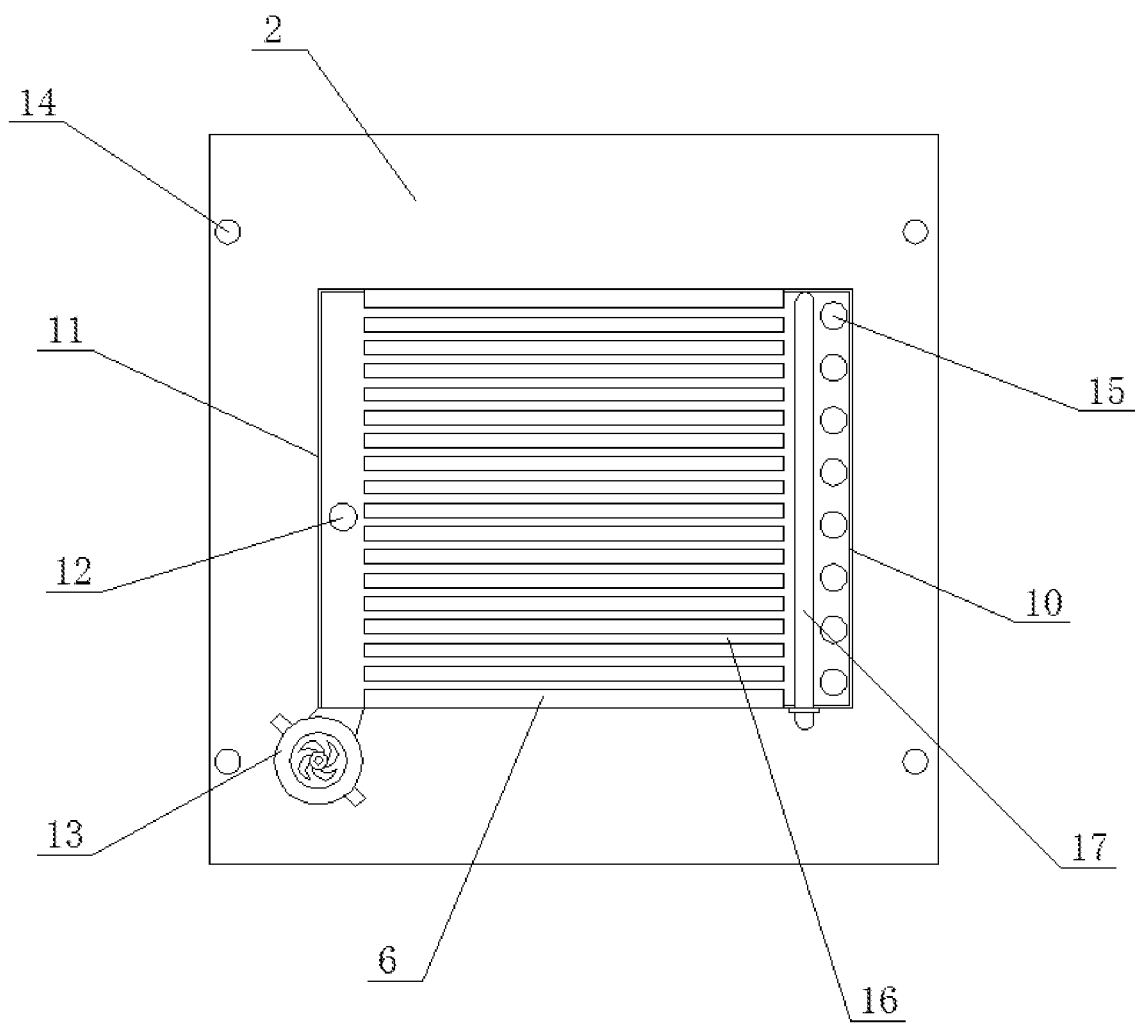
FIG. 5 shows the cutaway view of the mounting plate of the pet house accessory with functions of air purification, sterilization and temperature regulation of the present disclosure.

As shown in FIG. 1 to FIG. 5, the present disclosure provides a pet house accessory with functions of air purification, sterilization and temperature regulation includes a shell 1, a mounting plate 2, a thermal conduction device 6, a semiconductor refrigeration sheet 7 and a sterilization device 11. A heat dissipation hole 5 is arranged at the center of the bottom of the shell 1, the thermal conduction device 6 is arranged at the center of the bottom of the mounting plate 2, the semiconductor refrigeration sheet 7 is fixedly installed at the bottom of the thermal conduction device 6, and a through hole 16 is defined inside the thermal conduction device 6. An exhaust pipe 10 and the sterilization device 11 are separately fixed on two sides of the thermal conduction device 6, and an air intake fan 13 is fixedly installed at one end of the sterilization device 11. An exhaust hole 15 is defined on the mounting plate 2 on one side of the thermal conduction device 6, the mounting plate 2 is installed on the top of the shell 1 through a mounting hole 14, and a sensor 17 is installed inside the exhaust pipe 10. The pet house accessory with functions of air purification, sterilization and temperature regulation of the present disclosure has a simple structure and is convenient to use.

Preferably, both sides of the shell 1 are provided with an air inlet 3, and the air intake fan 13 is arranged on one side of the air inlet 3, so as to extract air outside the pet house.

Preferably, the mounting plate 2 is integrally formed with the thermal conduction device 6. By using the mounting plate 2 and the thermal conduction device 6, the thermal conduction efficiency can be improved and the power waste can be reduced.

Preferably, a radiator 8 is fixedly installed at the bottom of the semiconductor refrigeration sheet 7, and a cooling fan 9 is fixed on the bottom of the radiator 8 through screws. The cooling fan 9 is arranged directly above the heat dissipation hole 5, which is convenient to cool down the semiconductor refrigeration sheet 7.

Preferably, a UV disinfection lamp 12 is fixedly installed inside the sterilization device 11, which is capable to purify the air, eliminate bacteria, and avoid the odor inside the pet house.

Preferably, a mounting groove 4 is defined at the center of the front side of the shell 1, a control switch is installed inside the mounting groove 4, and the control switch is electrically connected with the semiconductor refrigeration sheet 7, the cooling fan 9, the UV disinfection lamp 12, the air inlet fan 13 and the sensor 17, so as to implement the functions of air purification, sterilization and temperature regulation for the pet house.

When using the pet house accessory with functions of air purification, sterilization and temperature regulation, the pet house accessory is installed at the bottom of the pet house through the shell 1. The mounting plate 2 is used as the bottom of the pet house, and a layer of pet pad is laid on the top of the mounting plate 2 to avoid direct contact between the pet and the mounting plate. The control switch is electrically connected with an external power supply through a wire. When it is necessary to cool down the interior of the pet house, the air inlet fan 13, the semiconductor refrigeration sheet 7, the cooling fan 9, the UV disinfection lamp 12 and the sensor 17 are controlled to start through the control switch, so that one side of the semiconductor refrigeration sheet 7 contacting with the thermal conduction device 6 is cooled, while the other side of the semiconductor refrigeration sheet 7 is heated, and the cooling fan 9 dissipates the heat generated by the semiconductor refrigeration sheet 7 through the radiator 8, so that the temperature of the thermal conduction device 6 and the mounting plate 2 is decreased. At the same time, the air inlet fan 13 draws air through the air inlet 3, and enters the interior of the through hole 16 after being disinfected by the UV disinfection lamp 12. Through the thermal conduction device 6, the air temperature decreases and is discharged into the pet house through the exhaust hole 15. When it is necessary to warm the pet house, by switching the control switch, heat is generated on the contact side of the semiconductor refrigeration sheet 7 connecting with the thermal conduction device 6. The heat is transferred to the mounting plate 2 through the thermal conduction device 6, the air is heated and the hot air enters the pet house through the exhaust hole 15. The pet house accessory with functions of air purification, sterilization and temperature regulation provided by the present disclosure is capable of cooling and heating by controlling the semiconductor refrigeration sheet 7 through the control switch to cool down and warm the pet house, and is convenient for pets to live. By using the mounting plate 2 and the thermal conduction device 6, the thermal conduction efficiency can be improved and the power waste can be reduced. By using the UV disinfection lamp 12, the air entering the pet house can be purified, the air quality inside the pet house can be improved, and the bacteria breeding can be avoided. The pet house accessory with functions of air purification, sterilization and temperature regulation of the present disclosure has a simple structure and is convenient to use.

Although the present invention has been described with reference to the embodiments thereof and the best modes for carrying out the present invention, it is apparent to those skilled in the art that a variety of modifications and changes may be made without departing from the scope of the present invention, which is intended to be defined by the appended claims.

What is claimed is:

1. A pet house accessory with functions of air purification, sterilization and temperature regulation, comprising a shell, a mounting plate, a thermal conduction device, a semiconductor refrigeration sheet and a sterilization device, wherein a heat dissipation hole is arranged at a center of a bottom of the shell, the thermal conduction device is arranged at a center of a bottom of the mounting plate, the semiconductor refrigeration sheet is fixedly installed at a bottom of the thermal conduction device, and a through hole is defined inside the thermal conduction device, an exhaust pipe and the sterilization device are separately fixed on two sides of the thermal conduction device, and an air intake fan is fixedly installed at one end of the sterilization device, an exhaust hole is defined on the mounting plate on one side of the thermal conduction device, the mounting plate is installed on a top of the shell through a mounting hole, and a sensor is installed inside the exhaust pipe.

2. The pet house accessory with functions of air purification, sterilization and temperature regulation according to claim 1, wherein both sides of the shell are provided with an air inlet, and the air intake fan is arranged on one side of the air inlet.

3. The pet house accessory with functions of air purification, sterilization and temperature regulation according to claim 1, wherein the mounting plate is integrally formed with the thermal conduction device.

4. The pet house accessory with functions of air purification, sterilization and temperature regulation according to claim 1, wherein a radiator is fixedly installed at a bottom of the semiconductor refrigeration sheet, and a cooling fan is fixed on a bottom of the radiator through screws, the cooling fan is arranged directly above the heat dissipation hole.

5. The pet house accessory with functions of air purification, sterilization and temperature regulation according to claim 1, wherein a UV disinfection lamp is fixedly installed inside the sterilization device.

6. The pet house accessory with functions of air purification, sterilization and temperature regulation according to claim 1, wherein a mounting groove is defined at a center of a front side of the shell, a control switch is installed inside the mounting groove, and the control switch is electrically connected with the semiconductor refrigeration sheet, the cooling fan, the UV disinfection lamp, the air inlet fan and the sensor.

* * * * *